United States Patent [19]

Goldfarb

[11] 3,655,169
[45] Apr. 11, 1972

[54] WATER VAPOR INJECTION SYSTEM AND METHOD FOR AN INTERNAL COMBUSTION ENGINE

[72] Inventor: Fred A. Goldfarb, 143 Jewett Avenue, Jersey City, N.J. 07304

[22] Filed: June 15, 1970

[21] Appl. No.: 46,388

[52] U.S. Cl. ............................261/35, 261/98, 261/DIG. 4, 123/25 A, 123/25 L
[51] Int. Cl. ..............................F02d 19/00, B01f 5/22
[58] Field of Search ............... 123/25.1, 25.4, 25 L; 261/91, 261/98, 35, 18.1, DIG. 4

[56] References Cited

UNITED STATES PATENTS

| | | | |
|---|---|---|---|
| 3,294,376 | 12/1966 | Eranosian | 261/DIG. 4 |
| 2,062,158 | 11/1936 | Berlowitz | 261/91 |
| 3,304,066 | 2/1967 | Vieceli et al. | 261/91 |
| 2,771,283 | 11/1956 | Eranosian | 261/91 |
| 3,151,188 | 9/1964 | Weatherston et al. | 261/91 |
| 3,220,707 | 11/1965 | Weatherston et al. | 261/91 |
| 3,155,746 | 11/1964 | Banks | 261/91 |
| 3,188,007 | 6/1965 | Myklebust | 261/91 |
| 1,566,332 | 12/1925 | Lilly | 123/25.4 |
| 2,591,057 | 4/1952 | Feldermann | 261/91 |
| 3,110,748 | 11/1963 | Myklebust | 261/91 |

*Primary Examiner*—Tim R. Miles
*Assistant Examiner*—Steven H. Markowitz
*Attorney*—Marshall A. Lerner

[57] ABSTRACT

A water vapor injection system for an internal combustion engine comprising an air washer and moisturizer for supplying clean moisturized air to a carburetor and method therefore. The device and method comprises a container for containing water or other suitable solution and, having directional scoops on the top for directing the flow of air onto the blades of a fan which is mounted on a hollow shaft immersed in the water with a spinner mounted on the same shaft and ports in the shaft arranged just above the spinner. A slotted impinger ring and a filter are arranged in a circumferential groove around the container and a tube is connected between the groove and a carburetor to supply the clean moisturized air to the carburetor to thereby permit the gas air mixture to burn more efficiently and to reduce exhaust pollution.

7 Claims, 3 Drawing Figures

Patented April 11, 1972 3,655,169
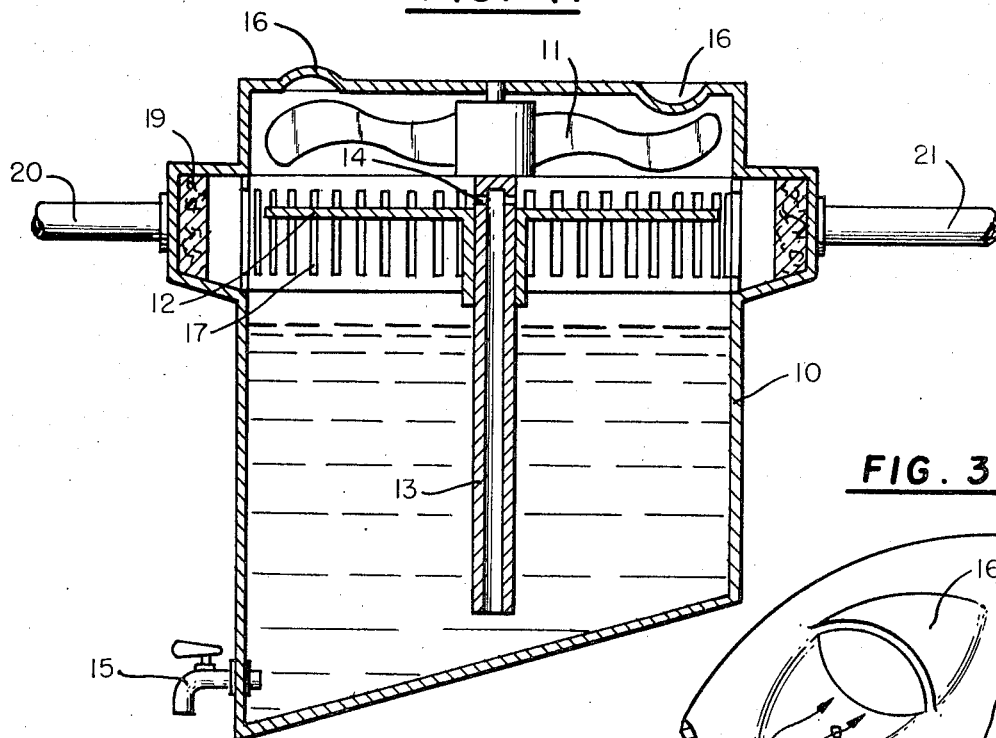
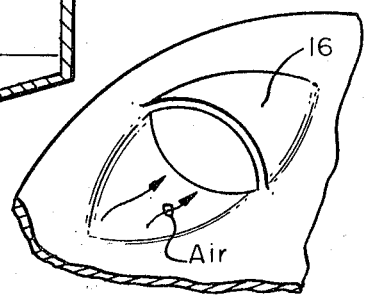
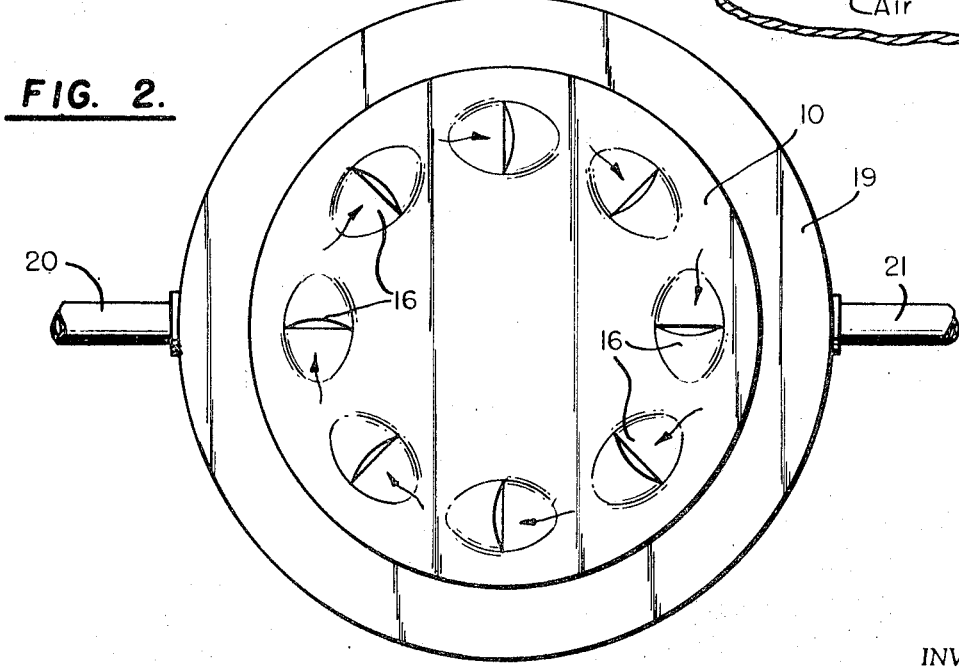
INVENTOR
Fred A. Goldfarb
BY Marshall A. Lerner
ATTORNEY

3,655,169

WATER VAPOR INJECTION SYSTEM AND METHOD FOR AN INTERNAL COMBUSTION ENGINE

BACKGROUND OF THE INVENTION

1. Field of Invention

The present invention relates to a water vapor injection system and more particularly to a device and method for supplying clean moisturized air to a carburetor used in conjunction with an internal combustion engine to reduce exhaust pollution.

2. Description of the Prior Art

In the field of carburetors for internal combustion engines, it has been the general practice to apply atmospheric air to the carburetor. In various prior art devices, the air is passed through a filter which is typically constructed of a treated paper substance. Such devices have not been entirely satisfactory since the filters have not been capable of providing sufficiently clean air to the carburetor and the air is not moisturized. The ultimate effect of such devices is the formation of a great deal of carbon in the engine and the emanation of exhaust gases which pollute the atmosphere.

SUMMARY OF THE INVENTION

The present invention provides a water vapor injection method and apparatus for an internal combustion engine which possess none of the aforedescribed disadvantages and in particular reduces exhaust pollution.

To attain this, the present invention provides an air cleaner and moisturizer consisting of a water container having an impeller comprising a fan and spinner. The fan is arranged at the top of a hollow shaft which is immersed in water in the container. Alternatively a solution of ether and wood alcohol or methanol could be used instead of water. The spinner is mounted on the shaft just slightly below the fan and above the level of the water with ports arranged on the shaft between the spinner and the fan. The top of the container has a series of holes arranged in a circle and shaped in the form of directional scoops to direct incoming air onto the blades of the fan. Alternatively, the fan may be rotated by an exhaust driven turbine.

A slotted impinger ring is arranged circumferentially around the container at about the level of the ports. A circular filter ring having a diameter slightly greater than that of the impinger ring is arranged concentric with the ring and in a circular groove around the side of the container.

A tube is used to connect the carburetor to the side of the container at the circumferential groove in which the ring shaped filter is arranged. A suction from the carburetor causes a current of air to be passed through the directional scoops arranged on the top of the container. This current of air impinges on the fan blades and rotates the fan. The rotation of the fan causes a suction of water through the hollow shaft and through the ports in the shaft onto the spinner. The rotation of the spinner causes the water to impinge on the impinger ring in atomized form and then onto the filter. The passage of air through the wet filter causes a washing and moisturizing of the air.

The carburetor mixes this water saturated clean air with fuel to reduce the rate of combustion of the fuel-air mixture thereby resulting in improved burning of the fuel. Water vapor injection raises the effective octane rating of the gasoline and permits the use of a lower priced gasoline in any automobile engine. In particular, it permits the use of regular fuel instead of ethyl or high test gasoline in high compression engines. Improved combustion prevents carbon from accumulating in the engine and, most of all, reduces exhaust pollution. Furthermore, spark plugs last longer. The use of a mixture of ether and wood alcohol or methanol instead of water would increase engine efficiency substantially.

The device may be used to provide clean moisturized air to a vehicle air conditioning system such as the type disclosed in my copending U.S. Pat. application Ser. No. 45,606 filed June 12, 1970 for an Air Conditioner. That invention provides for a tube connecting the air washer and moisturizer to a screw type of compressor used in the air conditioning system. The compressed air from the compressor is passed to a vortex tube having a cold air outlet which passes the cooled air to a heat exchanger which passes the cooled air to the vehicle cabin.

Accordingly, an object of the present invention is to provide a water vapor injection system for an internal combustion engine.

Another object of the present invention is to provide means for reducing exhaust pollution from an internal combustion engine.

A further object of the present invention is to provide a method for supplying clean moisturized air to a vehicle carburetor.

Still another object is to provide means for supplying clean moisturized air to be used in a vehicle air conditioner.

Yet another object of the present invention is to provide means for increasing the effective octane rating of gasoline used in an internal combustion engine and further increase engine efficiency.

Still a further object of the present invention is to provide means for increasing the useful life of spark plugs and maintain an internal combustion engine cleaner by reducing the carbon accumulation in the engine.

Other objects, advantages and novel features of the present invention will become apparent from the following detailed description of the invention when considered in conjunction with the accompanying drawings.

BRIEF DESCRIPTION OF THE DRAWINGS

FIG. 1 is a diagram of an embodiment of the present invention; and

FIG. 2 is a top view of the container used in the present invention; and

FIG. 3 is a detailed view of a hole shaped like a directional scoop in the top of the container.

DESCRIPTION OF THE PREFERRED EMBODIMENT

Referring now to FIG. 1, there is shown an embodiment of the present invention consisting of a container 10 which contains water of any other suitable solution such as a mixture of ether and wood alcohol or methanol. The air cleaner has a fan 11 and spinner 12 mounted on a shaft 13 which is immersed in the water solution. Shaft 13 is hollow and open at the bottom and contains ports 14 arranged slightly above spinner 12. Directional scoops 16 for directing the flow of incoming air are arranged on the top of the container. A slotted impinger ring 17 is arranged circumferentially around the container at about the level of the spinner 12. Container 10 further contains a drain spout 15 for draining settled dirt and water.

A circular filter ring 19 is arranged in a circumferential groove around container 10. Output tubes 20 and 21 are arranged on either side of the container ring holding filter 19 as shown. Output tube 20 is connected to the carburetor to supply clean air and water vapor thereto. Output tube 21 may be connected to a screw type of compressor used in a vehicle air conditioner as taught and shown in my copending U.S. Pat. application Ser. No. 45,606 filed June 12, 1970.

FIG. 2 is a plan view of the container 10 showing the directional scoops 16 arranged around the top.

FIG. 3 shows directional scoop 16 in greater detail. Directional scoop 16 is contoured so as to direct incoming air onto the blades of fan 11 to thereby cause the fan to rotate.

In the operation of the present invention, a vacuum from the carburetor to which tube 20 is connected causes air directed through directional scoops 16 to impinge on the blades of fan 11 to thereby cause it to rotate. The rotation of fan 11 causes water to be pumped through the center of shaft 13 and out ports 14. The rotation of the spinner causes the water to be impinged on impinger ring 17 and thereby atomized. The atomized water is applied to filter 19. The intake air of the air cleaner is passed through wet filter 19 and is thereby washed and moisturized. Clean moisturized air is fed to a carburetor through tube 20. Clean moisturized air may be fed through tube 21 to a compressor to be used for air conditioning the vehicle as taught in my above noted copending patent application.

The mixing by the carburetor of the moisturized air with gasoline improves the burning of the fuel by slowing it down. The injection of water vapor raises the effective octane rating of the fuel and permits the use of a lower priced gasoline than would otherwise be required. In particular, it permits the use of regular gasoline instead of high test gasoline in a high compression engine. Furthermore, water vapor injection improves combustion which thereby reduces exhaust pollution. The improved combustion reduces the carbon accumulation and further increases the useful life of spark plugs.

Obviously many modifications and variations of the present invention are possible in the light of the above teachings. For example, the water solution may be replaced by any suitable substance such as a mixture of ether and wood alcohol or methanol. This would increase the engine efficiency and, in particular, the available horsepower capacity as much as 40 per cent. It is therefor to be understood that within the scope of the appended claims the invention may be practiced otherwise than as specifically described.

I claim:

1. In combination, a carburetor and a suction operated water vapor injection system for supplying clean moisturized air to said carburetor comprising
   a container for containing a liquid solution having vents in the form of directional scoops for venting air therein;
   filter means;
   fan operated impeller means arranged in said container to enable the air vented through said directional scoops to impinge thereon, and containing means for pumping said liquid solution and causing it to impinge on said filter, said means for pumping comprising a hollow shaft and a circular spinner disk arranged on said shaft with ports arranged on said shaft just above said circular spinner disk; and
   output means for connecting said carburetor to said system for rotating said fan operated impeller means and having said filter means arranged adjacent thereto.

2. The device as described in claim 1 further containing a slotted impinger ring arranged in close proximity to the circumference of said slotted impinger disk for atomizing said liquid solution.

3. A method for supplying clean moisturized air to a carburetor of an internal combustion engine system comprising the steps of:
   venting air into a liquid container having directional scoops onto the blades of a fan operated impeller means operative to pump said liquid contained in said container on to a rotating disk which is rotated by said fan operated impeller means,
   vaporizing said liquid which is pumped onto said rotating disk
   passing said vapor through a filter and thence through a suction outlet to said carburetor 4. The method of claim 3 wherein said vaporized liquid is further atomized by an impinging ring arranged adjacent to the circumference of said rotating disk.

5. The method of claim 4 wherein said liquid is water.

6. The method of claim 4 wherein said liquid is a mixture of ether and wood alcohol.

7. The method of claim 4 wherein said liquid is methanol.

* * * * *